United States Patent [19]

Kern

[11] 4,041,510

[45] Aug. 9, 1977

[54] INDICATING DEVICE FOR PHOTOGRAPHIC APPARATUS

[75] Inventor: Frederick William Kern, Fairport, N.Y.

[73] Assignee: Eastman Kodak Company, Rochester, N.Y.

[21] Appl. No.: 656,037

[22] Filed: Feb. 6, 1976
(Under 37 CFR 1.47)

[51] Int. Cl.² .............................................. G03B 17/36
[52] U.S. Cl. ...................................... 354/217; 354/86; 352/172
[58] Field of Search .................... 354/217, 218, 83, 86; 352/72, 172

[56] References Cited

U.S. PATENT DOCUMENTS

| | | | |
|---|---|---|---|
| 3,011,419 | 12/1961 | Takahama | 354/217 |
| 3,120,781 | 2/1964 | Babcock | 352/72 |
| 3,297,397 | 1/1967 | Grant | 352/172 |
| 3,563,145 | 2/1971 | Benooni | 354/86 |
| 3,619,047 | 11/1971 | Neudecker | 352/172 |

Primary Examiner—Monroe H. Hayes
Attorney, Agent, or Firm—W. C. Dixon

[57] ABSTRACT

An indicating device in a camera indicates unambiguously whether or not the camera is loaded with film, and how much of the film has been exposed. The device is first indexed from an empty-camera position to a loaded-camera position in response to insertion of film into the camera. It is then indexed sequentially to succeeding positions, each representing the next film image area to be exposed, in response to actuation of a film transport member. The device is thus indexed ultimately to a final position signifying that no film image area remains to be exposed. It is then returned to its empty-camera position in response to removal of the film from the camera. At each of its positions the device presents an identifying indicium to a viewing site to indicate visually the corresponding camera condition. The device is especially useful in a processing camera where it indicates positively whether no film is in the camera or whether a full supply of film covered by a dark slide is in the camera.

13 Claims, 11 Drawing Figures

INDICATING DEVICE FOR PHOTOGRAPHIC APPARATUS

BACKGROUND OF THE INVENTION

1. Field of the Invention

The present invention relates generally to photography, and particularly to means on a camera for indicating unambiguously whether or not the camera is loaded with film.

2. Description of the Prior Art

It has long been known to provide a camera with means for indicating how much film in the camera has been or remains to be exposed. Such means typically are actuated by a camera mechanism that operates in conjunction with movement of a film image area to or from its exposure position in the camera.

For example, U.S. Pat. No. 2,741,168 discloses a 35mm still-picture camera having a rotatable counter wheel bearing indicia that are sequentially presentable to a viewing window. The periphery of the wheel is provided with ratchet teeth that are engaged by a detent spring to prevent backward rotation of the wheel. The wheel is rotated, or indexed, in its forward direction by a spring-like indexing finger attached to a manually reciprocatable slide member. Also attached to the slide member is a pair of spring-like finger that are adapted to engage sprocket holes provided along the marginal edge portions of film in the camera to advance succeeding image areas of the film sequentially to and from an exposure position. The slide member is first pulled in a direction outwardly from the camera body to draw the indexing finger away from the counter wheel and to move the film-advancing fingers to a film-engaging position. As the slide member is then pushed back into the camera body, the film-advancing fingers engage an appropriate pair of sprocket holes to advance both the exposed image area out of the exposure position and the next unexposed image area into the exposure position. As the film is so advanced, the indexing finger engages an appropriate one of the ratchet teeth and rotates the counter wheel to a position wherein the next succeeding indicium appears in the viewing window. After all of the film image have been exposed, the numeral 0 appears in the window to so advise the user.

The camera body is then detached from the lens-and-shutter assembly and turned over to a processing laboratory for development of the film. A new camera body containing a fresh supply of unexposed film, and displaying the numeral 0 in its viewing window, is then attached to the lens-and-shutter assembly. Thus, while it reasonably can be assumed that film, either exposed or unexposed, is always present in such a camera body when in the possession of the user, there is an ambiguity in this system in that when 0 appears in the window, there is nothing to indicate whether none or all of the film has been exposed.

For another example, U.S. Pat. No. 1,626,606 discloses a camera adapted to receive a film holder containing a plurality of sheet-like film units that are sequentially exposable and transportable from an exposure position in the camera to a processing tank attached to the camera. A rotatable counter wheel bears indicia that are sequentially movable to a viewing site to indicate the number of film units which have been exposed and transported to the processing tank. The counter wheel is rotated, or indexed, from one numerical position to the next by movement of a reciprocatable film-advancing lever to its film-engaging position. During movement of the lever in the opposite, film-advancing direction, the counter wheel is prevented from rotating backward by detent means engaged therewith.

Thus, as in U.S. Pat. No. 2,741,168, the counter wheel rotates unidirectionally from its initial position sequentially through its several numerical positions and thence to its initital position again, whereby the initial position indicates that either none of the film units or all of them have been exposed and transported. Moreover, since there is nothing in the counter mechanism that senses presence or absence of a film holder in the camera, the counter wheel could be in its initial position, or any other position, when there is no film in the camera.

Of more recent vintage is U.S. Pat. No. 3,653,313, which discloses an exposure counter used in a single-lens-reflex type of processing camera. The counter comprises a rotatable wheel having on its periphery a plurality of indicia that are sequentially presented to a viewing window as the wheel is rotated. A serious ambiguity exists in this counter in that when the wheel presents the indicium D to the viewing window, the camera may be in either of two mutually exclusive states: (1) there may be no cartridge in the camera at all, or (2there may be a fully loaded cartridge, i.e., one having a full complement of (ten) film units with a dark slide covering them, in the camera. Consequently, when the letter D appears, there is no externally visible way of indicating to the user whether or not the camera has a cartridge in it.

The counter wheel is rotated, or indexed, in its counting direction in response to movement of the camera's reflux mirror during each exposure-and-processing cycle. Starting with the camera when fully loaded, the counter wheel is indexed from its letter-D position to its number-1 position during the cycle in which the dark slide is exposed and ejected from the cartridge, then sequentially to its number-2 through number-10 positions during the succeeding cycles in which film units 1 through 9 are exposed and ejected, and finally to its letter-E position during the cycle in which film unit 10 is exposed and ejected, leaving the cartridge empty. When the cartridge is removed from the camera, a return spring rotates the counter wheel back to its empty-camera position, wherein the letter D again appears in the viewing window.

Insertion of a cartridge into the camera causes two things to happen: (1) it allows an indexing pawl coupled to the mirror to be spring-urged into engagement with ratchet teeth on the counter wheel, without moving the wheel, and (2) it allows an anit-backup pawl to be spring-urged into engagement with the ratchet teeth to prevent backward rotation of the wheel. Conversely, removal of the cartridge from the camera causes both the indexing pawl and the anti-backup pawl to be moved out of engagement with the ratchet teeth, thereby freeing the wheel for backward movement by the return spring to its empty-camera position. It will thus be seen that, since the counter wheel does not change position upon insertion of a cartridge, the counter disclosed in this patent suffers from the ambiguity that results from displaying the same indicium in the viewing window when the camera is in two mutually exclusive conditions.

One approach to eliminating such ambiguity is suggested in U.S. Pat. No. 1,583,656. This patent discloses a motion-picture camera having a film-footage indicator that is movable under a viewing window in response to changes in the radius of the film winding on a supply spool inserted into the camera. Changes in film-winding radium are sensed by a movable follower arm that is spring-urged toward the center of the spool. The arm thus moves radially inward between the spool's opposing flanges as the film is unwound. The arm, being coupled to the film-footage indicator, moves the indicator accordingly.

In order to remove the spool from the camera, the follower arm must first be moved radially outward beyond the spool flanges. That is done when a slidable latch member is pulled to unlatch the camera loading door. As the follower arm is thus moved beyond the spool flanges, the film-footage indicator is simultaneously moved to a corresponding position. As long as the latch member remains pulled out, whether any film is in the camera or not, and whether the door is open or closed, the follower arm and indicator will remain so moved, thereby presenting a possible ambiguity to the user. After a new spool of film has been inserted and the door then closed, the latch member must be pushed back in to its fully latched position before the follower arm and indicator can sense and indicate the film footage. Thus the system disclosed in this patent not only poses the possible ambiguity mentioned, but also requires the separate step of manipulating a latch member in order to render the system operative.

The camera devices described in the foregoing paragraphs are exemplary of various means in a camera for indexing a film counter, or indicator, that operate in association with movement of film to or from its exposure position. In all of them, the counter or indicator may present some ambiguity to the user. With particular regard to the matter of positively determining presence or absence of film in a camera, another body of prior art is of interest. Such prior art discloses various camera adjustments that may be made in response to insertion of a film cartridge into the camera.

For example, U.S. Pat. No. 2,043,901 discloses a motion-picture camera having a movable member that senses a coded dimension of a recess or projection on a film magazine inserted into the camera. The sensing member translates the sensed dimension to an adjustable exposure control mechanism to adjust the mechanism in accordance with the film sensitivity represented by the dimension.

Similarly, U.S. Pat. No. 2,493,928 discloses a motion-picture camera having electrical contact means for sensing the length of a conductive strip on a cartridge of film inserted into the camera, the length of the strip being coded in accordance with the film sensitivity, to adjust an exposure control device in the camera.

U.S. Pat. No. 3,025,777 discloses a 35mm still-picture camera having mechanical means for sensing the locations of two projections on an inserted cartridge, the locations of the projections being coded in accordance with film sensitivity, for the purpose of adjusting an exposure control indicating device in the camera.

Similarly, German Pat. No. 864,803 discloses a 35mm still-picture camera having a sensing member that is engaged and pivoted by a projection on a cartridge being inserted into the camera. The length of the projection is coded to represent the type and sensitivity of film in the cartridge. Movement of the sensing member is used, via a gear segment and pinion, to rotate an indicating dial in accordance with those film characteristics.

U.S. Pat. No. 2,320,722 discloses a 35mm still-picture camera having an indicia-bearing member that is movable, in response to insertion of a cartridge into the camera, to a position indicating the type of film in the cartridge. This camera poses the ambiguity that the same indicium is displayed when a cartridge containing "normal" film is in the camera as when no cartridge is in the camera.

U.S. Pat. No. 3,110,215 discloses various embodiments of an invention usable in motion-picture cameras. The invention relates to magazine orientation indicators for cameras adapted to use reversible film magazines, particularly such indicators capable of showing whether a reversible magazine has been inserted into a camera in its first-side or second-side orientation. The invention comprises coding means on the first and second sides of the magazine, to distinguish one side from the other, and a code sensing member in the camera that is movable, in response to insertion of the magazine, by an amount proportional to the coding means.

In one embodiment, the sensing member bears indicia indicating whether an inserted cartridge is in its first-side or second-side orientation, or whether there is no cartridge in the camera at all. While this embodiment thus eliminates the aforementioned ambiguity regarding presence or absence of film in the camera, its indicator is in no way connected to, or associated with, the camera's film-footage indicator, but instead constitutes a second indicating device built into the camera, thereby increasing the complexity and cost of the camera and requiring the user to observe two indicators.

In an alternative embodiment, a rotatable code sensing member adapted to sense first-side or second-side orientation of an inserted magazine is coupled to an indicating arm that cooperates with the film-footage indicator dial. When the magazine is inserted in its second-side orientation, the sensing member and indicating arm are rotated to a position wherein an indicium on the arm indicating second-side orientation is presented to a viewing window. During such rotation, the indicating arm rotates the film-footage indicator dial by an incremental amount to compensate for the shorter length of lead er attached to what initially was the film supply spool but now is the film take-up spool. Thus the user an definitely tell when an inserted magazine is in its second-side orientation. However, the same ambiguity referred to above in connection with other prior-art cameras exists in this embodiment, in that the code sensing member, the indicating arm, and the film-footage indicator dial all occupy the same respective positions under two mutually exclusive camera conditions: (1) when a magazine is in the camera in its first-side orientation, and (2) when there is no magazine in the camera at all. Hence, this patent fails to resolve the problem of eliminating such ambiguity without resorting to a second indicating device in the camera.

Finally, U.S. Pat. No. 3,485,157 discloses a 35mm still-picture camera adapted to receive film cartridges having a projection whose location is coded to represent the number of exposures provided for on the strip of film in the cartridge. The camera has a code sensing member which is movable, in response to insertion of a cartridge into the camera, by an amount proportional to the coded location of the projection. Movement of the code sensing member causes an exposure indicator dial to be rotated to a position that presents to a viewing window the number of exposures available in the cartridge. While this device is helpful in indicating the length of film supplied by a coded cartridge inserted into the camera, there still exists serious ambiguity of the type referred to above. Thus, when the number 36 appears in the window, any one of the following three conditions may prevail: (1) there may be a 36-exposure cartridge in the camera, (2) there may be an uncoded cartridge in the camera, or (3) there may be no cartridge in the camera.

It is well known, of course, to provide a camera with a viewing window through which the user can view backing paper attached to film loaded into the camera. The film may simply be roll film, e.g., size-127 film, supplied on a spool which is inserted into the camera; or it may be film supplied in a cartridge, e.g., a size-126 cartridge, having a viewing window that becomes aligned with the camera window when the cartridge is inserted into the camera. In either case, the user can tell at a glance whether there is film in the camera or not, and how much of the film has been or remains to be exposed. Such information is readily provided by indicia printed on the film backing paper and viewed through the viewing window(s). While this wellknown expedient leaves no room for ambiguity, it obviously is feasible only with film having backing paper or other opaque covering material adapted to prevent fogging of the film through the viewing window(s). Some widely used films, e.g., 35mm films and integral self-processable film units, typically are supplied in cartridges without such backing material. For such films, an indicating device in the camera is highly desirable.

A review of all the prior art discussed in the foregoing paragraphs indicates a long-felt but unresolved need for a simple, reliable, and convenient device in a photographic camera that indicates precisely and exclusively, i.e., without ambiguity, the true state or condition of the camera, relative to film used therein, at any particular time; a device that operates automatically, i.e., without requiring any special manipulation by the user to render it operative; a device that does not rely on film covering material to do the indicating; a device that does not require a special indicator in addition to a film-exposure of film-footage indicator already provided on the apparatus.

SUMMARY OF THE INVENTION

Accordingly, a principal object of the present invention is to provide a photographic camera with a simple, reliable, and convenient device that indicates precisely and exclusively, i.e., without ambiguity, the true state or condition of the camera, relative to film used therein, at any particular time.

Another object of the invention is to provide such a device that functions automatically, i.e., one that does not require any special manipulation by the user to render it operative.

Still another object of the invention is to provide such a device that does not rely on any film covering material to do the indicating.

A further object of the invention is to provide such a device that does not require a special indicator in addition to a film-exposure or film-footage indicator already provided on the apparatus.

A still further object of the invention is to provide such a device for use particularly in a processing camera having a film unit counter, wherein the device cooperates with the counter to indicate unambiguously whether or not there is a film unit cartridge, or cassette, loaded in the camera.

These and other objects and advantages are realized in a photographic camera constructed according to the present invention. Such a camera, adapted for use with an insertable and removable cartridge containing sequentially exposable film image areas, comprises means defining an exposure station; means defining a chamber for receiving the cartridge in an operative position wherein the film image areas are sequentially locatable at said exposure station; means for making an exposure of each of the film image areas when located at said exposure station; means actuatable after each said exposure for transporting the exposed one of the film image areas from said exposure station; means defining a site for displaying indicia presented thereto; an exposure counter bearing indicia for identifying the film image areas and for indicating, exclusively, absence and presence of the cartridge in said chamber, said counter being mounted for movement to a plurality of positions respectively presenting said indicia to said site, said positions including a first position presenting to said site a first indicium indicating exclusively of the cartridge from said chamber, a second position presenting to said site a second indicium indicating exclusively presence of the cartridge in said chamber, and subsequent positions presenting sequentially to said site subsequent indicia identifying respectively the film image areas; first biasing means biasing said counter in a first direction toward said first position; ratchet means coupled to said counter; indexing means movably mounted for engaging said ratchet means and indexing said counter, in a second direction opposite to said first direction, from said first position to said second position in response to insertion of the cartridge into said operative position in said chamber and for preventing said first biasing means from returning said counter to said first position so long as the cartridge remains in said operative position; second biasing means for urging said indexing means away from said ratchet means in response to removal of the cartridge from said chamber, to permit said first biasing means to return said counter to said first position, said indexing means being movable into counter-indexing engagement with said ratchet means in opposition to said second biasing means upon insertion of the cartridge into said operative position; advancing means movably mounted for engaging said ratchet means and advancing said counter in said second direction to a respective one of said subsequent positions in response to each actuation of said transporting means; and third biasing means biasing said advancing means away from said ratchet means irrespective of absence or presence of the cartridge in said chamber, said advancing means being movable into counter-advancing engagement with said ratchet means in opposition to said third biasing means upon actuation of said transporting means.

In the preferred embodiment of the invention illustrated herein, an indicating device is provided for use particularly in a processing camera adapted to receive an insertable and removable cassette initially containing a stack of sheet-like elements including a cover sheet overlying a plurality of self-processable film units. The camera includes means defining an exposure station; means defining a compartment for supporting the cassette in an operative position wherein first the cover sheet and then the film units are sequentially locatable at the exposure station; means for effecting an exposure of each of the film units when located at the exposure station; means defining a processing station adapted to initiate processing of each of the film units; and means actuatable for transporting each of the sheet-like elements from the exposure station to the processing station. The indicating device comprises means defining a site for displaying indicia presented thereto; an indicia-bearing member mounted for movement from a first position presenting to said site a first indicium indicating exclusively absence of the cassette from the compartment, to a second position presenting to said site a second indicium indicating exclusively presence of the cassette in the compartment with the cover sheet located at the exposure station, to subsequent positions presenting sequentially to said site subsequent indicia each indicating presence of the cassette in the compartment with a respective one of the film units located at the exposure station, to a final position presenting to said site a final indicium indicating exclusively presence of the cassette in the compartment with neither the cover sheet nor any of the film units located at the exposure station, and back to said first position presenting to said site said first indicium indicating exclusively absence of the cassette from the compartment; first spring means biasing said indicia-bearing member in a first direction toward said first position; ratchet means coupled to said indicia-bearing member; indexing means movably mounted for engaging said ratchet means and indexing said indicia-bearing member, in a second direction opposite to said first direction, from said first position to said second position in response to insertion of the cassette into its operative position in the compartment and for preventing said first spring means from returning said indicia-bearing member to said first position so long as the cassette remains in its operative position; second spring means for urging said indexing means away from said ratchet means in response to removal of the cassette from the compartment, to permit said first spring means to return said indicia-bearing member to said first position, said indexing means being movable into driving engagement with said ratchet means in opposition to said second spring means upon insertion of the cassette into its operative position; advancing means movably mounted for engaging said ratchet means and advancing said indicia-bearing member in said second direction to a respective one of said subsequent and final positions in response to each actuation of the transporting means; and third spring means biasing said advancing means away from said ratchet means irrespective of absence or presence of the cassette in the compartment, said advancing means being movable into drivng engagement with said ratchet means in opposition to said third spring means upon actuation of the transporting means.

It will be seen that the present invention achieves the aforementioned objects thereof, and in so doing provides advantages not found in the prior art. Various means for practicing the invention and other advantages and novel features thereof will become apparent in the detailed description of the illustrated embodiments presented below.

BRIEF DESCRIPTION OF THE DRAWINGS

In the detailed description of the illustrated embodiments presented below, reference is made to the accompanying drawings, wherein like reference numerals denote like elements, and wherein.

DESCRIPTION OF THE ILLUSTRATED EMBODIMENTS

Because certain parts of photographic and related apparatus are well known, the following description is directed in particular to those elements forming, cooperating directly with, or relating to the present invention. Elements that are not specifically shown or described herein are selectable from those known in the art.

THE PREFERRED EMBODIMENT

Figure 1:
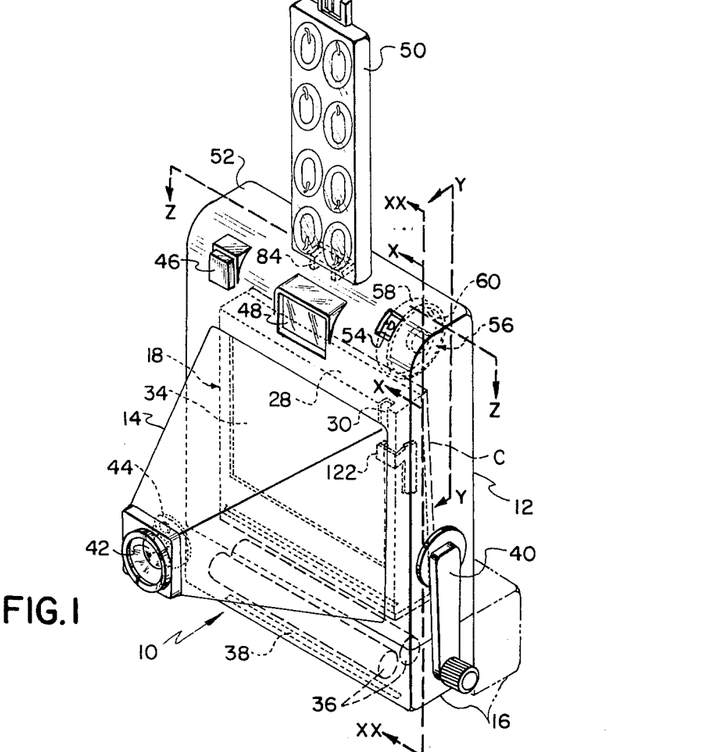
FIG. 1 is a perspective front view of a processing camera incorporating an indicating device constructed in accordance with the preferred embodiment of the present invention.

FIG. 1 of the drawings illustrates a processing camera incorporating an indicating device constructed in accordance with the preferred embodiment of the present invention. The camera housing 10 includes a thin, substantially rectangular, main housing portion 12 and, extending forwardly therefrom and configured generally as a truncated pyramid, a lens housing portion 14. Pivotally connected to the bottom of main housing portion 12 is a roller housing portion 16.

Figure 2:
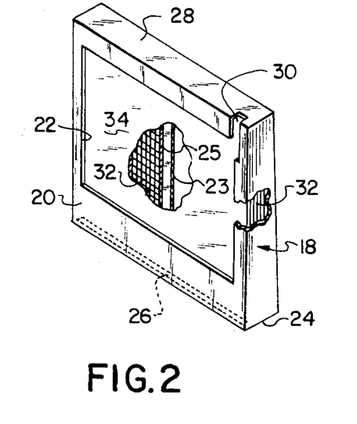
FIG. 2 is a perspective front view of a cassette adapted for use in the camera of FIG. 1, the cassette containing a plurality of self-processable film units covered by an opaque cover sheet.

The camera is especially adapted for use with an insertable and removable cartridge or cassette 18, shown in FIG. 2, that initially contains a stack of sheet-like elements including an opaque cover sheet or dark slide 34 overlying a plurality of, in this case ten, self-processable film units 32. Cassette 18, generally rectangular in shape, has a forward wall 20 with an exposure aperture 22 therein, a rearward wall 23, a front end wall 24 with an elongate exit slot 26 therein, and a rear end wall 28 with a film unit picker slot 30 provided therein and in the adjacent portion of forward wall 20. Disposed between the rearwardmost film unit and rearward wall 23 is a spring-biased platen 25 urging dark slide 34 and film units 32 toward forward wall 20. Slots 26 and 30 initially are covered to prevent fogging of the film units prior to their light-tight enclosure within the camera. Each of the film units has, at its end nearest slot 26, a rupturable pod of processing fluid.

Figure 7:
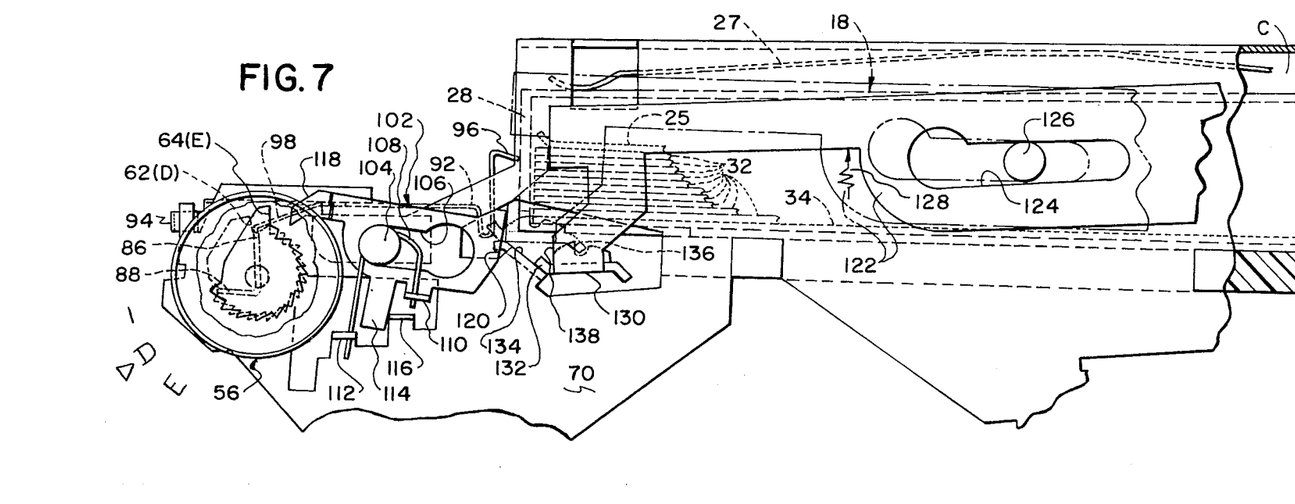
FIG. 7 is an enlarged cross-sectional view similar to FIG. 5 but showing the indicating device in its position when a fully loaded cassette is in the camera.
Figure 8:
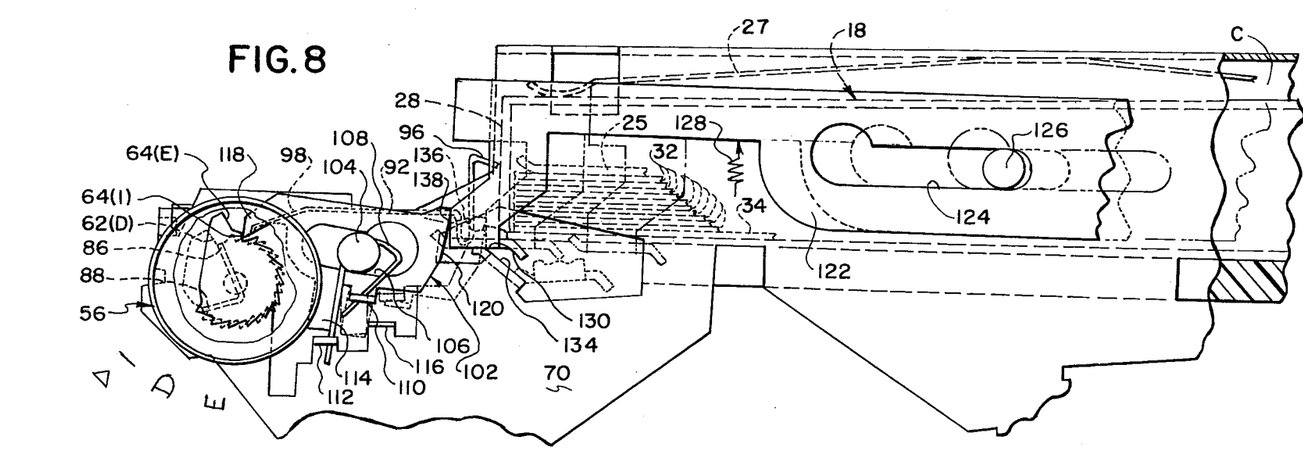
FIG. 8 is an enlarged cross-sectional view similar to FIGS. 5 and 7 but showing the indicating device in its position when the opaque cover sheet is about to be removed from the cassette.

Main housing portion 12 of the camera includes means defining a chamber or compartment C configured to support cassette 18 in an operative position, wherein first dark slide 34 and then film units 32 are sequentially locatable at an exposure station or position in the cassette substantially coincident with the focal plane of the camera's objective lens 42. Urging the cassette forwardly toward its operative position is a pair of leaf springs 27 that bear against cassette rearward wall 23 when the cassette is fully inserted into compartment C, as shown in FIG. 7. Roller housing portion 16 supports a pair of juxtaposed, pressure-applying rollers 36 which define a processing station adapted to rupture the pod on, and thereby initiate processing of, each film unit as it moves therethrough. In the bottom wall of roller housing portion 16 is an elongate exit slot 38 through which each film unit leaves the camera after passing between rollers 36.

The camera is provided with a power-input means such as hand crank 40, which is operable to drive a film-engaging picker 122, for transporting an exposed film unit from its exposure position to the roller nip, and at least one of the rollers for driving the film unit through the nip and thence out of the camera. Mounted in the forward end of lens housing portion 14, behind lens 42, is a shutter mechanism 44. The shutter mechanism is actuatable by depressing a shutter release button 46 mounted on main housing portion 12. Also on main housing portion 12 are a conventional viewfinder 48 and a socket 84 for receiving a flash array 50 comprising a plurality of electrically fireable flash lamps.

Figure 3:
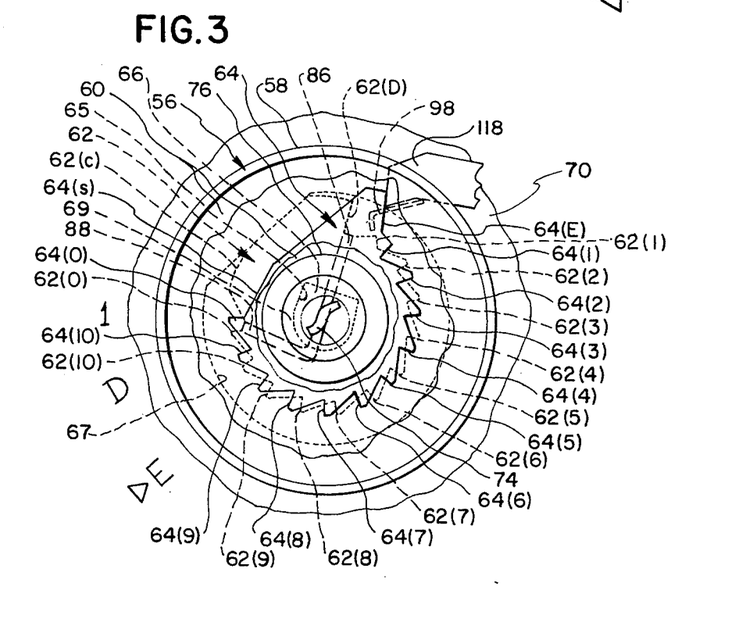
FIG. 3 is an enlarged cross-sectional view taken along line X—X of FIG. 1, showing the counter wheel in the preferred embodiment with portions thereof broken away to show details of its construction.

In top wall 52 of main housing portion 12 is a viewing window 54 disposed above a counter wheel 56 inside the housing. The peripheral surface 58 of counter wheel 56 is provided with a series of indicia that are sequentially presented to window 54 as wheel 56 is rotated. Such indicia comprise, in the sequence in which they are presented: the letter E, indicating an empty-camera condition; the letter D, indicating a loaded-camera condition wherein the dark slide is at the exposure station; the numbers 1 through 10, each identifying the film unit that is next to be exposed; and the number 0, indicating an empty-cartridge condition. Wheel 56 is shown in FIG. 3 with an annular portion of its end wall 60 broken away to illustrate details of first and second ratchet wheels 62 and 64, respectively, associated with wheel 56. As viewed in FIG. 3, first ratchet wheel 62 is mounted behind second ratchet wheel 64, both ratchet wheels being coaxial and rotatable with wheel 56.

Figure 10:
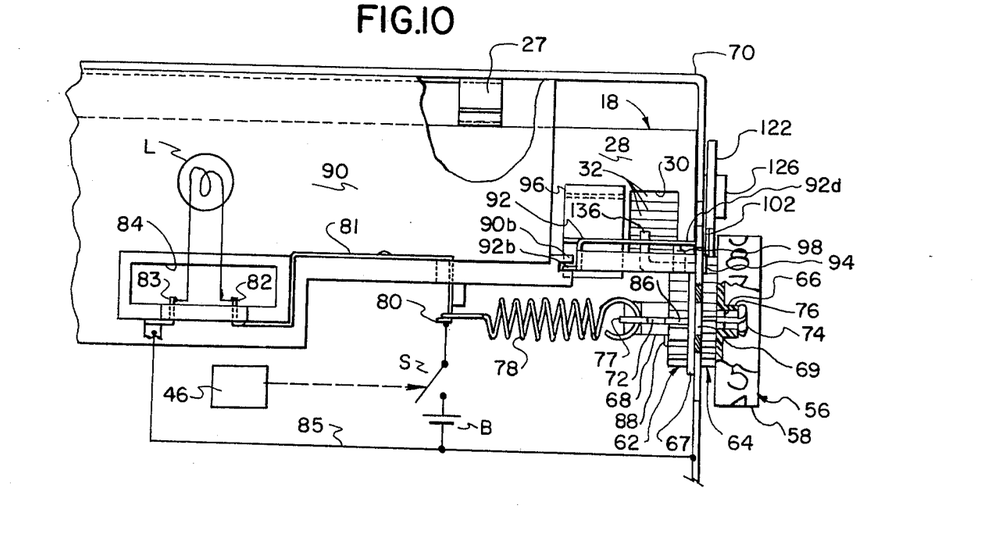
FIG. 10 is an enlarged cross-sectional view taken along line Z—Z of FIG. 1, showing means cooperating with the indicating device for preventing ignition of an attached flash unit when the opaque cover sheet is in the cassette and when no film unit is in the cassette.

In the preferred embodiment, second ratchet wheel 64 is molded integrally with wall 60 and has in its central portion a D-shaped aperture 65. Aperture 65 matingly receives a short, slotted, D-shaped shaft 66 that extends forwardly from a truncated circular bearing plate 67, on the back of which is mounted first ratchet wheel 62. Extending rearwardly from first ratchet wheel 62 is a short, slotted, generally rectangular-shaped shaft 68, shown in FIG. 10. In the preferred embodiment, D-shaped shaft 66, bearing plate 67, first ratchet wheel 62, and rectangular shaft 68 are molded as one integral part. Molded around the base of D-shaped shaft 66, adjacent to bearing plate 67, is a circular shoulder 69 having a length sufficient to keep the bearing plate spaced from second ratchet wheel 64 by an amount slightly greater than the thickness of a steel mounting plate 70 on which the two molded parts, when coupled, are mounted. Shoulder 69 thus serves as a journal that is rotatably received in a circular aperture provided in mounting plate 70 so that the two ratchet wheels can rotate with shoulder 69 on opposite sides of the mounting plate, as shown in FIG. 10.

Passing longitudinally through the slotted center portions of both molded parts is a metal connecting member 72, one end 74 of which is twisted or bent over the end of hub 76 of wheel 56. The opposite end 77 of connecting member 72 is connected to a coil spring 78 which in turn is connected to a metal tab 80 as shown in FIG. 10. Tab 80 is electrically connected, via a conductor 81, to one contact 82 in the aforementioned flash array socket 84. The other contact 83 in socket 84 is electrically connected, via a conductor 85, to mounting plate 70. A source of electrical potential such as battery B and a switch S are electrically connected in series between tab 80 and conductor 85. Switch S is shown schematically closable in response to actuation of shutter release button 46. The battery and switch could be replaced by a suitable piezo crystal adapted to be energized upon actuation of button 46. A lamp L of the flash array is schematically shown connected across the socket contacts 82 and 83. As shown in FIGS. 3 and 10, connecting member 72 has two radially outwardly extending arms 86 and 88 that are angularly spaced by approximately 99°.

As viewed in FIG. 3, first ratchet wheel 62 has a plurality of ratchet teeth pointing in a generally clockwise direction around a major portion of the wheel's periphery. Such teeth comprise a first or high-rise tooth 62(D) followed in clockwise succession by teeth 62(1), 62(2), 62(3), 62(4), 62(5), 62(6), 62(7), 62(8), 62(9), 62(10), and 62(0). Tooth 62(0) is followed by a long, sloping cam surface 62(c) that terminates at high-rise tooth 62(D). Angularly spaced slightly ahead of the teeth on ratchet wheel 62 are a similar plurality of ratchet teeth pointing in a generally clockwise direction around a major portion of the periphery of second ratchet wheel 64. The teeth on wheel 64 comprise a first or high-rise tooth 64(E) followed in clockwise succession by teeth 64(1), 64(2), 64(3), 64(4), 64(5), 64(6), 64(7), 64(8), 64(9), 64(10), and 64(0). Tooth 64(0) is followed by a long, sloping surface 64(s) that terminates at high-rise tooth 64(E).

As mentioned above and shown in FIGS. 10, 4, and 6, the first and second ratchet wheels are mounted coaxially on opposite sides of mounting plate 70. FIG. 10 illustrates the mounting of both ratchet wheels and the counter wheel as viewed from above the camera with top wall 52 is removed, while FIGS. 4 and 6 illustrate the same components as viewed from behind the camera with its rear wall removed.

Figure 4:
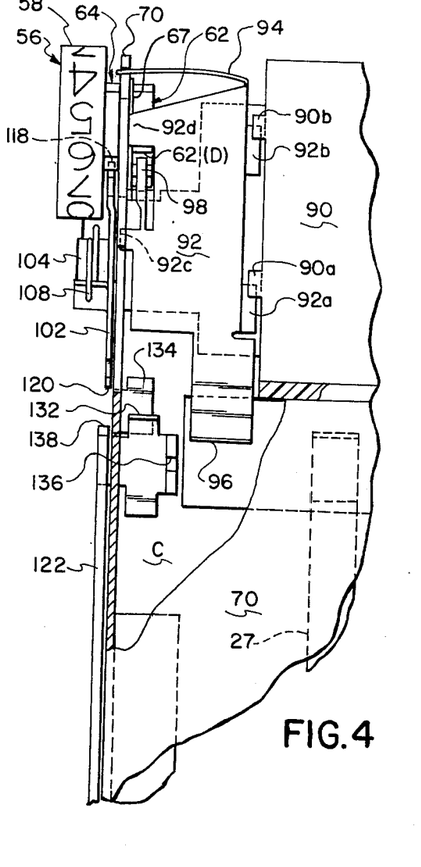
FIG. 4 is an enlarged cross-sectional view taken along line Y—Y of FIG. 1, showing the indicating device in its position when no cassette is in the camera.
Figure 6:
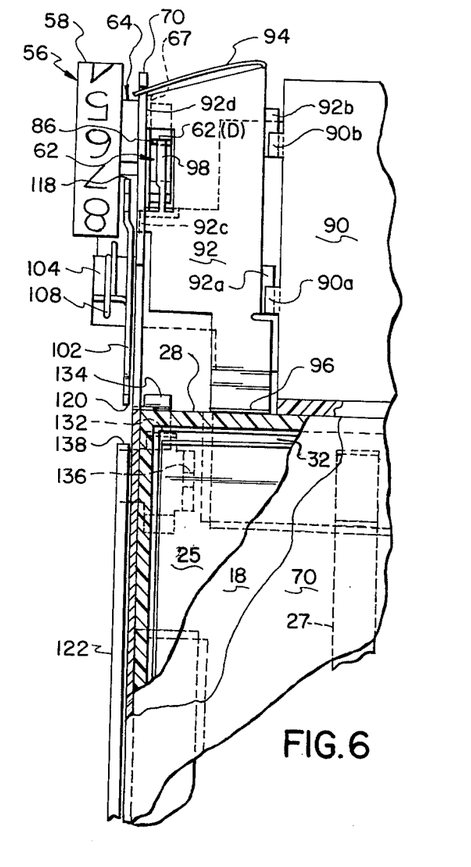
FIG. 6 is an enlarged cross-sectional view similar to FIG. 4 but showing the indicating device in its position when a fully loaded cassette is in the camera.

Also shown in FIGS. 4 and 6 is part of a camera frame member 90 having a pair of grooved ears 90a and 90b extending therefrom in a direction generally toward the counter wheel. Mounting plate 70 and frame member 90 are rigidly secured to each other by means not shown. Slidably mounted between plate 70 and member 90 is a cassette sensing member 92 having a pair of tabs 92a and 92b that are supported by ears 90a and 90b, respectively, for sliding movement relative thereto. Extending from the opposite side of sensing member 92 in a direction generally toward the counter wheel is another pair of tabs 92c and 92d. Tab 92c is slidably received in a shallow groove in plate 70, while tab 92d abuts against the adjacent surface of plate 70.

At the upper end of sensing member 92, as viewed in FIGS. 4 and 6, is a cantilever spring 94 whose free end is trapped in a v-shaped slot in the top end of plate 70. Spring 94 exerts a downward-biasing influence on member 92, and thus urges member 92 to its lower position shown in FIG. 4 when no cassette is in the camera. At the lower end of sensing member 92 is a resilient, z-shaped sensing finger 96 which, when no cassette is in the camera, extends into the aforementioned cassette-receiving compartment C, as shown in FIG. 4. Extending upwardly between tabs 92c and 92d, and toward ratchet wheel 62, is an indexing and anti-backup pawl 98 that is engageable with ratchet wheel 62.

Figure 5:
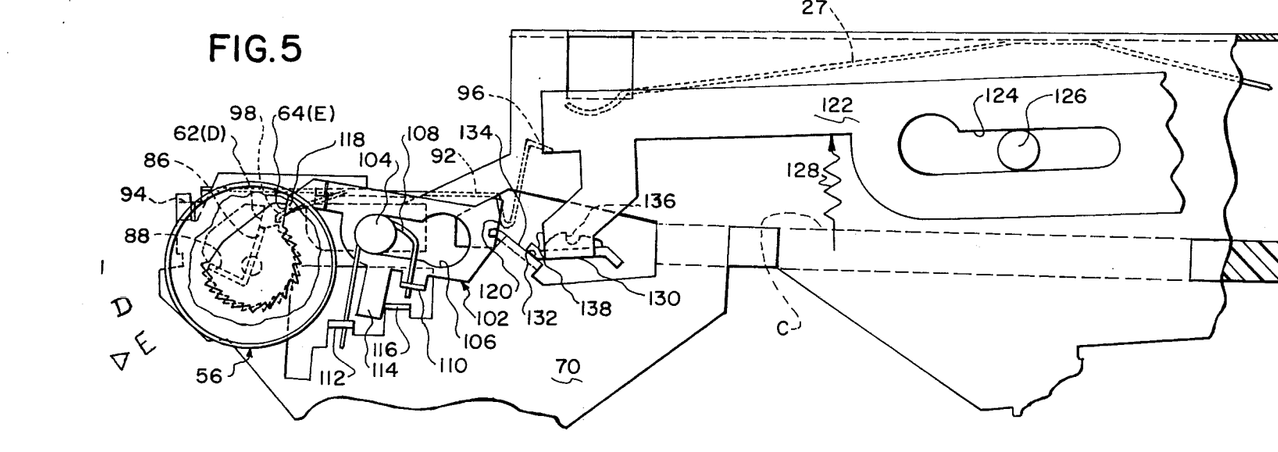
FIG. 5 is an enlarged cross-sectional view taken along line XX—XX of FIG. 1, showing the indicating device in its position when no cassette is in the camera.

As previously mentioned, ratchet wheel 64 and counter wheel 56 are disposed on the side of plate 70 opposite to that on which ratchet wheel 62 is located. Immediately below ratchet wheel 64 as seen in FIG. 4, and immediately to the right of ratchet wheel 64 as seen in FIG. 5, is a counter wheel advancing member 102 pivotally mounted about a pin 104 secured to plate 70. Pin 104 is received in an elongate slot 106 in member 102 which permits both translational and rotational movement of member 102 relative to ratchet wheel 64. A spring 108 wrapped around pin 104 has its ends trapped between an ear 110 on member 102 and an ear 112 on plate 70. Spring 108 thus biases member 102 both in a counterclockwise direction toward ratchet wheel 64 and in a rightward direction away from ratchet wheel 64, and thus toward its rest position shown in FIGS. 5, 7, and 9, wherein a tab 114 on member 102 is in abutting engagement with an ear 116 on plate 70. It will be seen in FIG. 5 that member 102 has at its left end a pawl 118, which is in abutting engagement with ratchet tooth 64(E) when no cassette is in the camera. At the right end of member 102 is a generally vertical engagement surface 120 which is engageable by the aforementioned picker 122 for the purpose of actuating member 102 in a leftward direction, against the biasing influence of spring 108, to advance the counter wheel.

Picker 122 also has an elongate slot 124 therein which receieves a pin 126 secured to plate 70. Picker 122 is biased in a generally clockwise direction about pin 126 by a spring 128, and is actuated for reciprocation toward and away from member 102 by motion transmitting means (not shown) driven by hand crank 40. On the lower-left extremity 130 of picker 122 is a follower tab 132, which rodes on an ear 134 on plate 70 during movement of picker 122 toward member 102, and thereby guides a picker claw 136 on extremity 130 toward its film-engaging position in slot 30 of cassette 18 when the cassette is in the camera. Also on extremity 130 is a generally vertical engagement surface 138, which engages surface 120 on member 102 and thereby actuates member 102 leftward to advance the counter wheel as picker 122 is moved to its film-engaging position. In this manner, upon actuation of picker 122 to transport either the dark slide or the foremost film unit from the exposure station to the roller nip, member 102 is actuated to engage the appropriate tooth on ratchet wheel 64 and thereby advance counter wheel 56 by an incremental amount needed to present the corresponding indicium on the counter wheel to viewing window 54.

The operation of the preferred embodiment of the present invention will now be explained with reference to FIGS. 1–10. When there is no cassette in the camera, the various parts heretofore described assume their positions shown in FIGS. 4 and 5. It will be seen in FIG. 4 that spring 94 has urged member 92 downward to its lower position, wherein sensing finger 96 extends into the cassette receiving compartment. This condition is also shown in FIG. 5, wherein member 92 is seen to have been urged to the right so that finger 96 extends into the cassette receiving compartment and pawl 98 is spaced from ratchet tooth 62(D). FIG. 5 further shows members 122 and 102 in their respective rest positions wherein engagement surface 138 is spaced from engagement surface 120 and wherein tab 114 is held against ear 116 by spring 108. Under this condition, return spring 78, by its clockwise-biasing influence, as viewed in FIG. 5, holds the counter wheel in its empty-camera position, wherein ratchet tooth 64(E) is held against pawl 118, and wherein the indicium E appears in viewing window 54, as indicated schematically by the pointer in FIG. 5. The counter wheel thus gives a positive visual indication that no cassette is in the camera. Needless to say, some indicium other than the letter E, e.g., a blank space, could just as well be used to provide such indication.

To insert cassette 18 into the camera, the user first pivots roller housing portion 16 from its closed position, shown in solid lines in FIG. 1, to its open position, shown in dash-dotted lines in FIG. 1, thereby opening cassette-receiving compartment C for receipt of the cassette. As the user then pushes the cassette into its fully inserted position in the cassette-receiving compartment, rear wall 28 of the cassette engages sensing finger 96 and moves member 92 upward as viewed in FIGS. 4 and 6, and to the left as viewed in FIGS. 5 and 7. Such movement of member 92 causes pawl 98 extending therefrom to engage ratchet tooth 62(D) and thereby index the ratchet wheel counterclockwise by an incremental amount sufficient to present an appropriate indicium such as the letter D to the viewing window. The counter wheel now gives a positive visual indication that a fully loaded cassette is in the camera.

In the usual situation, wherein the user inserts a cassette containing a full complement of unexposed film units covered by an opaque cover sheet or dark slide, appearance of the indicium D in the viewing window means that the dark slide is located at the exposure station in the camera. With the cassette thus fully seated in its operative position, the user now need only move roller housing portion 16 back to its closed position before proceeding to effect removal of the dark slide.

With cassette 18 fully inserted in the camera, the various members described above with reference to FIGS. 4 and 5 are now positioned as shown in FIGS. 6 and 7. FIG. 6 shows that cassette rear end wall 28 is in abutting engagement with camera frame member 90 and sensing member 96. Member 92 is shown in its upper position wherein spring 94 has been flexed and wherein pawl 98 has engaged ratchet tooth 62(D) and thereby indexed ratchet wheel 62 and counter wheel 56 to present indicium D to the viewing window. Similarly, FIG. 7 shows the cartridge fully inserted, its rear end wall 28 having engaged sensing finger 96 and thereby moved member 92 and pawl 98 to the left, thereby indexing the counter wheel as just described.

It will be noted that when the counter wheel is positioned as shown in FIGS. 6 and 7, pawl 98 is not only in abutting engagement with ratchet tooth 62(D) but is also in electrical contact with arm 86 of contact member 72. As already explained with reference to FIG. 10, contact member 72 is connected, via return spring 78, tab 80, and conductor 81, to contact 82 in flash array socket 84, while member 92 is connected, via spring 94, tab 92d, and tab 92c, to mounting plate 70. It will thus be seen that when the counter wheel is indexed to its position shown in FIGS. 6 and 7, contact 82 also is electrically connected to plate 70 via the electrical contact between arm 86 and pawl 98, thereby shorting the flash firing circuit so that flash lamp L of inserted array 50 cannot be fired should the user actuate shutter release button 46 while the dark slide is still in the cassette and therefore at the exposure station in the camera.

To remove the dark slide from the cassette, the user must actuate picker 122 by energizing its drive means. Hand crank 40 is shown in FIG. 1 to illustrate a convenient means for energizing the picker drive. Although not shown, the picker drive could comprise, for example, a simple rack-and-pinion or cam-and-follower arrangement to convert rotational motion of the hand crank into reciprocation of the picker. Also not shown are gears coupling the hand crank to rollers 36. It will be apparent to those skilled in the art that energizing means other than a hand crank, such as a spring motor or an electric motor, could be employed to accomplish the same purpose.

In accordance with the preferred embodiment illustrated herein, the user turns hand crank 40 to effect both reciprocation of picker 122 and rotation of rollers 36. The reciprocation of picker 122 includes a first stroke entailing substantially leftward movement of the picker from its initial position shown in FIGS. 5 and 7 to its film-engaging position shown in FIG. 8 and a second stroke entailing substantially rightward movement back to its initial position. Not shown in any of FIGS. 5, 7, 8, and 9 is the camera's processing station, comprising rollers 36 inside roller housing portion 16, which in those figures would be located to the right of picker 122. Thus, with the first complete revolution of hand crank 40, picker 122 is caused to move leftward to its film-engaging position and then rightward to "pick" the dark slide and thereby transport it from the exposure station to the roller nip. At that point, the picker becomes disengaged, by means not shown, so that continued turning of the crank effects only further rotation of the rollers to drive the dark slide through the nip and out of the camera.

With the first half-revolution of the hand crank, the picker is moved through its first stroke described above. During the first stroke, counter wheel 56 is advanced from its "D" position to its "1" position by the coaction of picker 122, advancing member 102, and ratchet wheel 64. That is to say, picker 12 engages and moved member 102 leftward so that pawl 118 engages ratchet tooth 64(1) and thereby moves ratchet wheel 64 and counter wheel 56 counterclockwise through one increment of angular displacement to the position shown in FIG. 8. As picker 122 then traverses its second stroke, while transporting the dark slide to the roller nip, spring 108 moves advancing member 102 rightward back to its rest position wherein tab 114 is engaged with ear 116 and wherein pawl 118 is withdrawn from engagement with ratchet wheel 64. To prevent spring 78 from returning the counter wheel to its "D" position, pawl 98 has by now dropped behind, or, as viewed in FIG. 8, to the right of, ratchet tooth 62(1), thereby providing a detent for preventing such return movement.

With the dark slide out of the camera, the user is ready to take his first picture by exposing the first film unit, which is now located at the exposure station by virtue of the forward-biasing influence of platen 25. After actuating shutter release member 46 to make the exposure, the user again operates hand crank 40 to effect another reciprocation of picker 122 and further rotation of rollers 36. Such action effects removal and processing of the exposed first film unit and actuates member 102 to advance the counter wheel from its "1" position to its "2" position, thereby indicating that the second film unit is the next to be exposed. Such actuation of member 102 causes pawl 118 to engage ratchet tooth 64(2) and thereby advance the counter wheel, after which pawl 98 drops in behind ratchet tooth 62(2) to provide the detent for preventing spring 78 from returning the counter wheel to its preceding position.

In the same manner, after the user exposes the second film unit he again operates crank 40 to remove and process that unit and to advance the counter wheel to its "3" position. This time, pawl 118 advances the counter wheel by engaging ratchet tooth 64(3), and pawl 98 provides the detent by engaging ratchet tooth 62(3).

Similarly, the user can sequentially expose and process the remaining film units and advance the counter to its next position. Referring to FIG. 3, it will be seen that the parenthetical suffix to the number designating the particular ratchet tooth engaged by either pawl 118 or pawl 98 indicates the number of the film unit that is next to be exposed, and thus the counter wheel number that will appear in the viewing window for the user to observe.

It will be noted that the detent teeth on ratchet wheel 62 are angularly displaced counterclockwise a few degrees from the corresponding advancing teeth on ratchet wheel 64. This out-of-phase relationship of the two ratchet wheels has been designed to ensure that pawl 98 will drop in behind the appropriate detent tooth on ratchet wheel 62 after pawl 118 has engaged the corresponding advancing tooth on ratchet wheel 64 and advanced the counter wheel. After each such advancement, because of the out-of-phase relationship, the counter wheel is allowed to rotate backward (clockwise a very small amount, under the influence of return spring 78, before the appropriate detent tooth engages pawl 98.

Thus, after the ninth film unit has been exposed, operation of crank 40 causes pawl 118 to engage ratchet tooth 64(10) and thereby advance the counter wheel to its "10" position, after which the counter wheel rotates backward slightly until detent tooth 62(10) engages pawl 98. Then, after the tenth (and last) film unit has been exposed, operation of crank 40 causes pawl 118 to engage ratchet tooth 64(0) and thereby advance the counter wheel to its "0" position, after which the counter wheel again rotates backward slightly until detent tooth 62(0) engages pawl 98.

Figure 9:
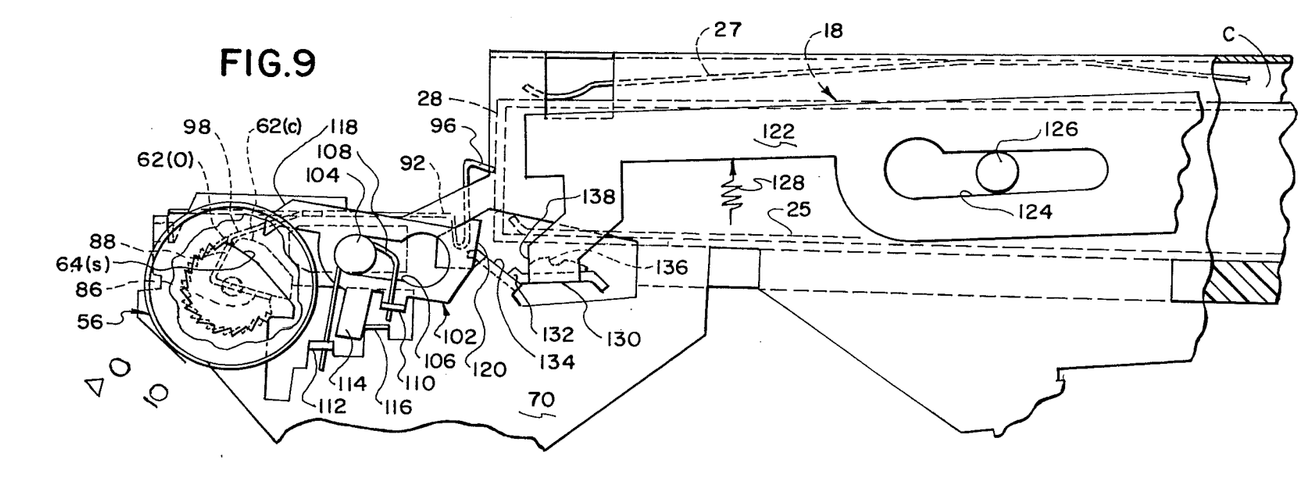
FIG. 9 is an enlarged cross-sectional view similar to FIGS. 5, 7, and 8 but showing the indicating device in its position when the last film unit has been removed from the cassette.

Continued operation of the crank causes the last film unit to be removed through exit slot 38, leaving the now-empty cassette in the camera, as indicated by the indicium 0 in the viewing window. This condition of the camera is illustrated in FIG. 9, wherein pawl 98 is shown in abutting engagement with detent tooth 62(0) and in electrical contact with arm 88 of connecting member 72. Contact 82 in socket 84 now is electrically grounded by the interconnection of arm 88 with pawl 98 and thence with mounting plate 70, in a manner similar to that already described with reference to the FIG. 7 condition wherein the dark slide was located at the exposure station and arm 86 was in contact with pawl 98. Thus, actuation of the shutter release member when an empty cassette is in the camera will not waste a flash bulb in an inserted array.

It will be seen in FIG. 9 that, even though pawl 118 could again engage advancing tooth 64(0) and thereby move the counter wheel a small amount, during such movement pawl 98 would merely ride up on cam surface 62(c), only to ride back down said surface, when pawl 118 is retracted, and into engagement again with detent tooth 62(0). Thus, any actuation of crank 40 after the last film unit has been removed, and therefore after the indicium 0 has appeared in the viewing window, will not cause any significant change in the counter wheel position. The counter wheel will therefore remain in its "O" position until roller housing portion 16 is opened and the empty cassette removed from the camera.

Upon removal of the cassette, spring 94 urges member 92 from its position shown in FIG. 9 to its position shown in FIG. 5, wherein sensing finger 96 again extends into the cassette-receiving compartment, and wherein pawl 98 is again withdrawn from the movementpath of the detent teeth on ratchet wheel 62, thereby permitting spring 78 to return the counter wheel to its "E" (empty-camera) position.

AN ALTERNATIVE EMBODIMENT

Figure 11:
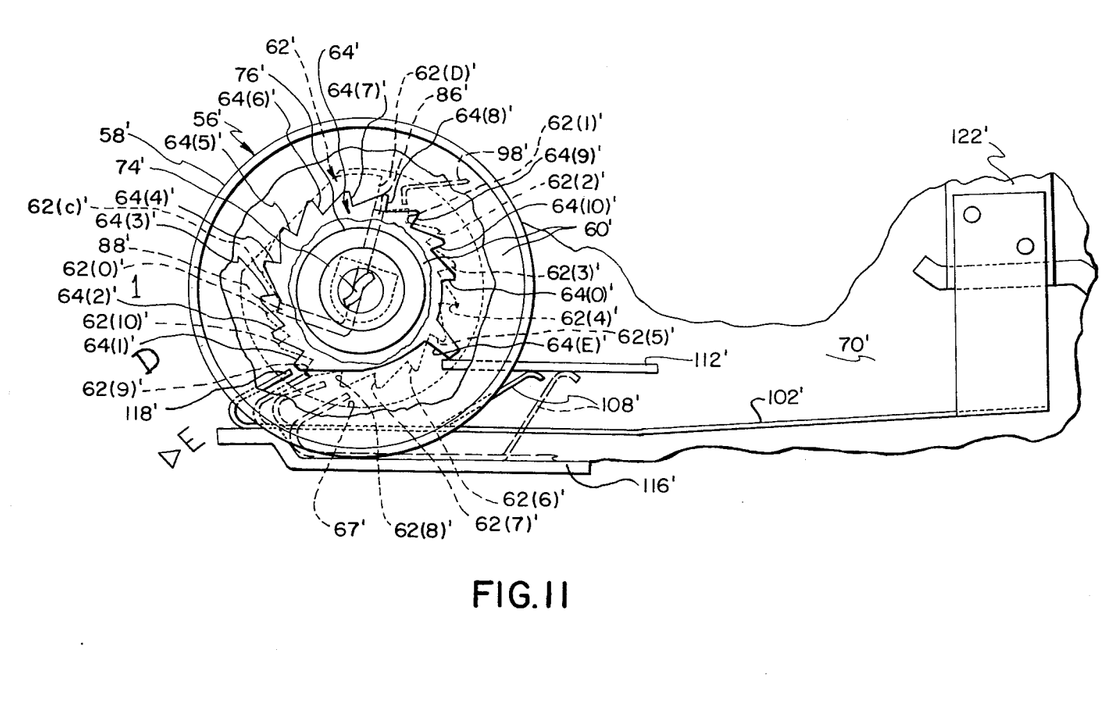
FIG. 11 is an enlarged cross-sectional view similar to FIG. 5 but illustrating an indicating device constructed in accordance with an alternative embodiment of the present invention.

FIG. 11 illustrates an indicating device constructed in accordance with an alternative embodiment of the present invention. In this embodiment, all structure not shown in FIG. 11 is presumed to be substantially the same as that illustrated in the other figures and described with reference to the preferred embodiment. The various parts shown in FIG. 11 are designated by the reference numerals used to designate equivalent parts in the preferred embodiment, with a prime added to distinguish the alternative embodiment. Counter wheel 56', ratchet wheel 62', arms 86' and 88', and pawl 98' are identical to their counterparts in the preferred embodiment.

Ratchet wheel 64', however, is different. In the emptycamera condition illustrated in FIG. 11, ratchet tooth 64(E)' is in abutting engagement with an ear 112' extending outwardly from mounting plate 70', thereby locating counter wheel 56' in its "E" (empty-camera) position to which the counter return spring has moved it. Pawl 98' is spaced from, and to the right of, ratchet tooth 62(D)'. When a cassette is inserted into the camera, pawl 98' moves leftward against tooth 62(D)' and thereby indexes the counter wheel counterclockwise to its "D" position, wherein ratchet tooth 64(1)' lies in the path of movement of claw 118'. As picker 122' and attached advancing member 102' move rightward from their leftmost position shown in FIG. 11, picker 122' transports the dark slide from the exposure station to the roller nip, while claw 118' engages ratchet tooth 64(1)' and advances the counter wheel counterclockwise to its "1" position. As in the preferred embodiment, pawl 98' then drops in behind detent tooth 62(1)' to prevent the return spring from returning the counter wheel to its initial position.

It will be seen that the movement of claw 118' are controlled not only by picker 122' but also by the interactions of advancing member 102', spring arm 108' extending diagonally upwardly therefrom, and ears 112' and 116' extending outwardly from mounting plate 70'. Ear 116' is formed with an inclined step near its left end to guide claw 118' appropriately toward and away from ratchet wheel 64' during each reciprocation of member 102'.

In addition to requiring fewer moving parts, this embodiment differs functionally from the preferred embodiment in that here the counter wheel is advanced during the film-transporting stroke of the picker, i.e., the stroke directed toward the processing station, whereas in the preferred embodiment the counter wheel is advanced during the opposite stroke of the picker, i.e., the stroke directed away from the processing station.

In both the preferred and alternative embodiments, the counter wheel is indexed from an empty-camera position to a dark-slide position in response to insertion of a cassette into the camera. Also in both embodiments, the flash firing circuit is rendered inoperative to prevent wasting a flash bulb whenever a fully loaded cassette is in the camera, with its dark slide at the exposure station, and whenever an empty cassette is in the camera. Both embodiments have been shown to fulfill the aforementioned objects of the invention. In particular, a single indicating device has been provided for automatically and unambiguously apprising the user of the particular condition of a camera at any of its several possible stages of use. Such a device has been shown to be especially useful in a processing camera, where it provides a convenient visual means for distinguishing between the empty-camera condition and the fully-loaded-camera condition, wherein a cover sheet, or dark slide, occupies the camera's exposure station.

The invention has been described in detail with particular reference to the illustrated preferred and alternative embodiments thereof, but it will be understood that variations and modifications can be effected within the spirit and scope of the invention.

What is claimed is:

1. A photographic camera for use with an insertable and removable cartridge containing sequentially exposable film image areas, said camera comprising:
   means defining an exposure station;
   means defining a chamber for receiving the cartridge in an operative position wherein the film image areas are sequentially locatable at said exposure station;
   means for making an exposure of each of the film image areas when located at said exposure station;
   means actuatable after each said exposure for transporting the exposed one of the film image areas from said exposure station;
   means defining a site for displaying indicia presented thereto;
   an exposure counter bearing indicia for identifying the film image areas and for indicating, exclusively, absence or presence of the cartridge in said chamber, said counter being mounted for movement to a plurality of positions respectively presenting said indicia to said site, said positions including a first position presenting to said site a first indicium indicating exclusively absence of the cartridge from said chamber, a second position presenting to said site a second indicium indicating exclusively presence of the cartridge in said chamber, and subsequent positions presenting sequentially to said site subsequent indicia identifying respectively the film image areas;

first biasing means biasing said counter in a first direction toward said first position;

ratchet means coupled to said counter;

indexing means movably mounted for engaging said ratchet means and indexing said counter, in a second direction opposite to said first direction, from said first position to said second position in response to insertion of the cartridge into said operative position in said chamber and for preventing said first biasing means from returning said counter to said first position so long as the cartridge remains in said operative position;

second biasing means for urging said indexing means away from said ratchet means in response to removal of the cartridge from said chamber, to permit said first biasing means to return said counter to said first position, said indexing means being movable into counter-indexing engagement with said ratchet means in opposition to said second biasing means upon insertion of the cartridge into said operative position;

advancing means movably mounted for engaging said ratchet means and advancing said counter in said second direction to a respective one of said subsequent positions in response to each actuation of said transporting means; and third biasing means biasing said advancing means away from said ratchet means irrespective of absence or presence of the cartridge in said chamber, said advancing means being movable into counter-advancing engagement with said ratchet means in opposition to said third biasing means upon actuation of said transporting means.

2. The photographic camera claimed in claim 1 wherein said transporting means comprises a film-engaging member actuatable into driving engagement with said advancing means so as to move said advancing means into driving engagement with said ratchet means and thereby advance said counter to the respective one of said subsequent positions.

3. The photographic camera claimed in claim 1 wherein said transporting means comprises a film-engaging member actuatable for movement toward and away from a film-engaging position, said movement including a first portion thereof directed toward said film-engaging position and a second portion thereof directed away from said film-engaging position; and wherein said advancing means is movable by said film-engaging member into driving engagement with said ratchet means to advance said counter during only one of said movement portions.

4. The photographic camera claimed in claim 3 wherein said advancing means is movable by said film-engaging member into driving engagement with said ratchet means to advance said counter during only said first movement portion.

5. The photographic camera claimed in claim 3 wherein said advancing means is movable by said film-engaging member into driving engagement with said ratchet means to advance said counter during only said second movement portion.

6. The photographic camera claimed in claim 1 wherein said ratchet means comprises a first plurality of ratchet teeth engageable by said indexing means and a second plurality of ratchet teeth engageable by said advancing means.

7. The photographic camera claimed in claim 1 wherein said indexing means comprises a sensing member extending into said chamber, and movable by the cartridge upon insertion thereof into said operative position, and a pawl coupled to said sensing member for movement thereby into counter-indexing engagement with said ratchet means.

8. For use in a processing camera adapted to receive an insertable and removable cassette initially containing a stack of sheet-like elements including a cover sheet overlying a plurality of self-processable film units, the camera including:

means defining an exposure station;

means defining a compartment for supporting the cassette in an operative position wherein first the cover sheet and then the film units are sequentially locatable at the exposure station;

means for effecting an exposure of each of the film units when located at the exposure station;

means defining a processing station adapted to initiate processing of each of the film units; and means actuatable for transporting each of the sheet-like elements from the exposure station to the processing station;

an indicating device comprising:

means defining a site for displaying indicia presented thereto;

an indicia-bearing member mounted for movement from a first position presenting to said site a first indicium indicating exclusively absence of the cassette from the compartment, to a second position presenting to said site a second indicium indicating exclusively presence of the cassette in the compartment with the cover sheet located at the exposure station, to subsequent positions presenting sequentially to said site subsequent indicia each indicating presence of the cassette in the compartment with a respective one of the film units located at the exposure station, to a final position presenting to said site a final indicium indicating exclusively presence of the cassette in the compartment with neither the cover sheet nor any of the film units located at the exposure station, and back to said first position presenting to said site said first indicium indicating exclusively absence of the cassette from the compartment;

first spring means biasing said indicia-bearing member in a first direction toward said first position;

ratchet means coupled to said indicia-bearing member;

indexing means movably mounted for engaging said ratchet means and indexing said indicia-bearing member, in a second direction opposite to said first direction, from said first position to said second position in response to insertion of the cassette into its operative position in the compartment and for preventing said first spring means from returning said indicia-bearing member to said first position so long as the cassette remains in its operative position;

second spring means for urging said indexing means away from said ratchet means in response to removal of the cassette from the compartment, to permit said first spring means to return said indicia-bearing member to said first position, said indexing means being movable into driving engagement with said ratchet means in opposition to said second spring means upon insertion of the cassette into its operative position;

advancing means movably mounted for engaging said ratchet means and advancing said indicia-bearing member in said second direction to a respective one of said subsequent and final positions in response to each actuation of the transporting means; and third spring means biasing said advancing means away from said ratchet means irrespective of absence or presence of the cassette in the compartment, said advancing means being movable into driving engagement with said ratchet means in opposition to said third spring means upon actuation of the transporting means.

9. The indicating device claimed in claim 8 wherein the transporting means comprises a film-engaging picker actuatable for reciprocative movement including a first stroke directed generally away from the processing station to engage the particular one of the sheet-like elements at the exposure station and a second stroke directed generally toward the processing station to transport the particular one of the sheet-like elements from the exposure station to the processing station, said advancing means being movable by said picker into driving engagement with said ratchet means to advance said indicia-bearing member during only one of said strokes.

10. The indicating device claimed in claim 9 wherein said one of said strokes is said first stroke.

11. The indicating device claimed in claim 9 wherein said one of said strokes is said second stroke.

12. The indicating device claimed in claim 8 wherein said indicia-bearing member comprises a counter wheel bearing said first, second, subsequent, and final indicia and movable rotatively to said first, second, subsequent, and final positions; and wherein said ratchet means comprises first and second ratchet wheels coupled to said counter wheel, said first ratchet wheel being drivingly engageable by said indexing means in response to insertion of the cassette into its operative position in the compartment, said second ratchet wheel being drivingly engageable by said advancing means in response to actuation of the transporting means.

13. Photographic apparatus as claimed in claim 8 wherein said indexing means comprises a sensing finger extending into the compartment, said finger being movable by the cassette upon insertion thereof into its operative position, and a pawl coupled to said finger for movement thereby into driving engagement with said ratchet means.

* * * * *

UNITED STATES PATENT OFFICE
CERTIFICATE OF CORRECTION

PATENT NO. : 4,041,510
DATED : August 9, 1977
INVENTOR(S) : Frederick William Kern It is certified that error appears in the above-identified patent and that said Letters Patent are hereby corrected as shown below:

On the first page of the patent, in the left-hand column, after INID Code [22], the parenthetical expression "(Under 37 CFR 1.47)" should be deleted, since this application was not so filed. On the first page of the patent, in the left-hand column, after INID Code [56], under "U.S. PATENT DOCUMENTS", "Babcock" should read --Babcock et al.--, "Grant" should read --Grant et al.--, "Benooni" should read --Bendoni et al.--. In Col. 1, line 27, "finger" should read --fingers--; line 44, after "image", the word --areas-- should appear. In Col. 2, line 25, "(2" should read --(2)--; line 33, "reflux" should read --reflex--; line 51, "anit-backup" should read --anti-backup--. In Col. 3, line 3, "radium" should read --radius--. In Col. 4, line 43, "lead er" should read --leader--; line 45, "an" (first occurrence) should read --can--. In Col. 5, line 22, "wellknown" should read --well-known--; line 42, "of" should read --or--. In Col. 6, line 16, "and" (second occurrence) should read --or--; line 21, after "exclusively", the word --absence--should appear. In Col. 10, line 35, "99°" should read --90°--. In Col. 11, line 55, "rodes" should read --rides--. In Col. 13, line 57, "12" should read --122--; line 57, "moved" should read --moves--; line 60, "counterclockewise" should read --counterclockwise--. In Col. 14, line 46, "(clockwise" should read --(clockwise)--. In Col. 15, line 28, "mentpath" should read --ment path--; line 47, "tycamera" should read --ty-camera--;

UNITED STATES PATENT OFFICE
CERTIFICATE OF CORRECTION

Patent No. 4,041,510          Dated August 9, 1977

Inventor(s) Frederick William Kern

It is certified that error appears in the above-identified patent and that said Letters Patent are hereby corrected as shown below:

line 67, "movement" should read --movements--.

Signed and Sealed this

Thirty-first Day of January 1978

[SEAL]

Attest:

RUTH C. MASON          LUTRELLE F. PARKER
*Attesting Officer*      *Acting Commissioner of Patents and Trademarks*